(12) United States Patent
Slovetskiy

(10) Patent No.: US 11,533,616 B2
(45) Date of Patent: Dec. 20, 2022

(54) SECURE AUTOMATED ONE TIME ZERO-TOUCH BOOTSTRAPPING AND PROVISIONING

(71) Applicant: T-Mobile USA, Inc., Bellevue, WA (US)

(72) Inventor: Sergey Slovetskiy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/138,502

(22) Filed: Dec. 30, 2020

(65) Prior Publication Data
US 2022/0210642 A1   Jun. 30, 2022

(51) Int. Cl.
| | |
|---|---|
| *H04W 12/06* | (2021.01) |
| *H04W 4/14* | (2009.01) |
| *H04W 12/72* | (2021.01) |
| *H04W 12/03* | (2021.01) |

(52) U.S. Cl.
CPC ........... *H04W 12/068* (2021.01); *H04W 4/14* (2013.01); *H04W 12/03* (2021.01); *H04W 12/72* (2021.01)

(58) Field of Classification Search
CPC .................................................... H04W 12/04

USPC .......................................... 455/436; 380/277
See application file for complete search history.

(56) References Cited

U.S. PATENT DOCUMENTS

| | | | |
|---|---|---|---|
| 2018/0109465 A1* | 4/2018 | Gonguet | H04W 4/18 |
| 2021/0084465 A1* | 3/2021 | Hadadi | H04W 8/183 |
| 2022/0029994 A1* | 1/2022 | Choyi | H04L 63/0435 |

* cited by examiner

*Primary Examiner* — Kiet M Doan
(74) *Attorney, Agent, or Firm* — Han Santos, PLLC

(57) ABSTRACT

Described herein are techniques for securely configuring a user device to operate on a wireless carrier network. In embodiments, the techniques may comprise receiving a bootstrapping request associated with a user device that includes at least an identifier for the user device, associating a limited use credential, a long-term use credential, and a communication identifier with the identifier for the user device, upon detecting activation of the identifier for the user device, providing, via a first communication channel related to the communication identifier, the limited use credential to the user device, and providing, via a second communication channel different from the first communication channel, the long-term use credential to the user device, the long-term use credential being cryptographically secured using the limited use credential, wherein the limited use credential is overwritten with a decrypted version of the long-term use credential.

15 Claims, 5 Drawing Sheets

SECURE AUTOMATED ONE TIME ZERO-TOUCH BOOTSTRAPPING AND PROVISIONING

BACKGROUND

While wireless carrier networks were once solely accessible by mobile phones, such networks are now becoming accessible to a multitude of other types of user devices. For example, wireless carrier networks are now often used by electronic devices that are each wirelessly connected to a server that provides backend processing support for that electronic device. These electronic devices, which are sometimes referred to as Internet of Things (IoT) devices, often include a device-specific cryptographic key that is used to secure communications over the wireless carrier network.

SUMMARY

Techniques are provided herein for securely configuring a user device for operation with a wireless carrier network. Typical user devices that operate on a wireless carrier network (mobile handsets as well as Internet of Things (IoT) devices) have a cryptographic key embedded into their hardware by a manufacturer. Conventionally, a manufacturer provides the wireless carrier with a list of each hardware device that will be used on the network and their corresponding cryptographic keys. However, when such a device is switched between networks, the new wireless carrier will usually not have access to the cryptographic key, which can prevent the use of the device on the new wireless carrier network. Currently, the wireless carrier, in order to resolve this issue, must contact the manufacturer to request the cryptographic key that is hardcoded into the device before secure communication can be established with the device. This process can be time-consuming at best and might not be possible if the manufacturer has gone out of business or refuses to provide the cryptographic key.

Embodiments of the disclosure are directed to techniques in which, during Subscriber Identification Module (SIM) card activation, a Mobile Station International Subscriber Directory Number (MSISDN) is assigned to the SIM based on a particular International Mobile Subscriber Identity (IMSI) from a range of IMSI numbers allocated to a type of device. When the SIM card is placed into a device of the appropriate type, verification of the device is performed by ensuring that the IMSI is in the allowed IMSI range. Provided that it is, a limited use credential is generated by the wireless carrier and provisioned onto the device via a secure "out-of-band" channel (e.g., via a Push message) using the MSISDN. In some cases, the limited use credential is written to the SIM card (as opposed to onto the hardware itself). Afterward, the device establishes communication with a bootstrapping server via a mobile data channel of the wireless carrier network and receives a new long-term credential that has been cryptographically secured using the limited use credential. The limited use credential is then overwritten with the long-term credential, enabling secure future communications over the wireless carrier network.

In one embodiment, a method is disclosed as being performed by a wireless carrier network, the method comprising receiving a bootstrapping request associated with a user device, the bootstrapping request comprising at least an identifier for the user device, associating a limited use credential, a long-term use credential, and a communication identifier with the identifier for the user device, upon detecting activation of the identifier for the user device, providing, via a first communication channel related to the communication identifier, the limited use credential to the user device, and providing, via a second communication channel different from the first communication channel, the long-term use credential to the user device, the long-term use credential being cryptographically secured using the limited use credential, wherein the limited use credential is overwritten with a decrypted version of the long-term use credential.

An embodiment is directed to a computing device comprising: a processor; and a memory including instructions that, when executed with the processor, cause the computing device to, at least, receive a bootstrapping request associated with a user device, the bootstrapping request comprising, at least, an identifier for the user device, associate a limited use credential, a long-term use credential, and a communication identifier with the identifier for the user device, upon detecting activation of the identifier for the user device, provide, via a first communication channel related to the communication identifier, the limited use credential to the user device, and provide, via a second communication channel different from the first communication channel, the long-term use credential to the user device, the long-term use credential being cryptographically secured using the limited use credential, wherein the limited use credential is overwritten with a decrypted version of the long-term use credential.

An embodiment is directed to a non-transitory computer-readable media collectively storing computer-executable instructions that upon execution cause one or more computing nodes to collectively perform acts comprising receiving a bootstrapping request associated with a user device, the bootstrapping request comprising at least an identifier for the user device, associating a limited use credential, a long-term use credential, and a communication identifier with the identifier for the user device, upon detecting activation of the identifier for the user device, providing, via a first communication channel related to the communication identifier, the limited use credential to the user device, and providing, via a second communication channel different from the first communication channel, the long-term use credential to the user device, the long-term use credential being cryptographically secured using the limited use credential, wherein the limited use credential is overwritten with a decrypted version of the long-term use credential.

The foregoing, together with other features and embodiments will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

This disclosure describes techniques that may be used to securely provision credentials onto a user device for use with a wireless carrier network. In some embodiments, a request is received to provision a user device with data (e.g., credentials) so that the user device can be configured to be operated on a wireless carrier network. In embodiments, the user device is assigned a communication identifier (e.g., a MSISDN) via which a first communication channel may be established over which a limited use credential is provided to the user device. Upon receipt of the limited use credential, the user device may initiate a bootstrap request secured using the limited use credential over a second communication channel. In response to the bootstrap request, the user device is provided with a long-term credential, with which the limited use credential is overwritten.

Embodiments of the disclosure provide for a number of advantages over conventional systems. For example, embodiments of the disclosure enable a user device to be configured in a secure manner such that it may be operated on a wireless carrier. In particular, the system enables user devices to be operated on a wireless carrier network even if that wireless carrier network does not have access to a cryptographic key associated with the user device, preventing a secure connection from being established between the wireless carrier network and the user device.

Figure 1:
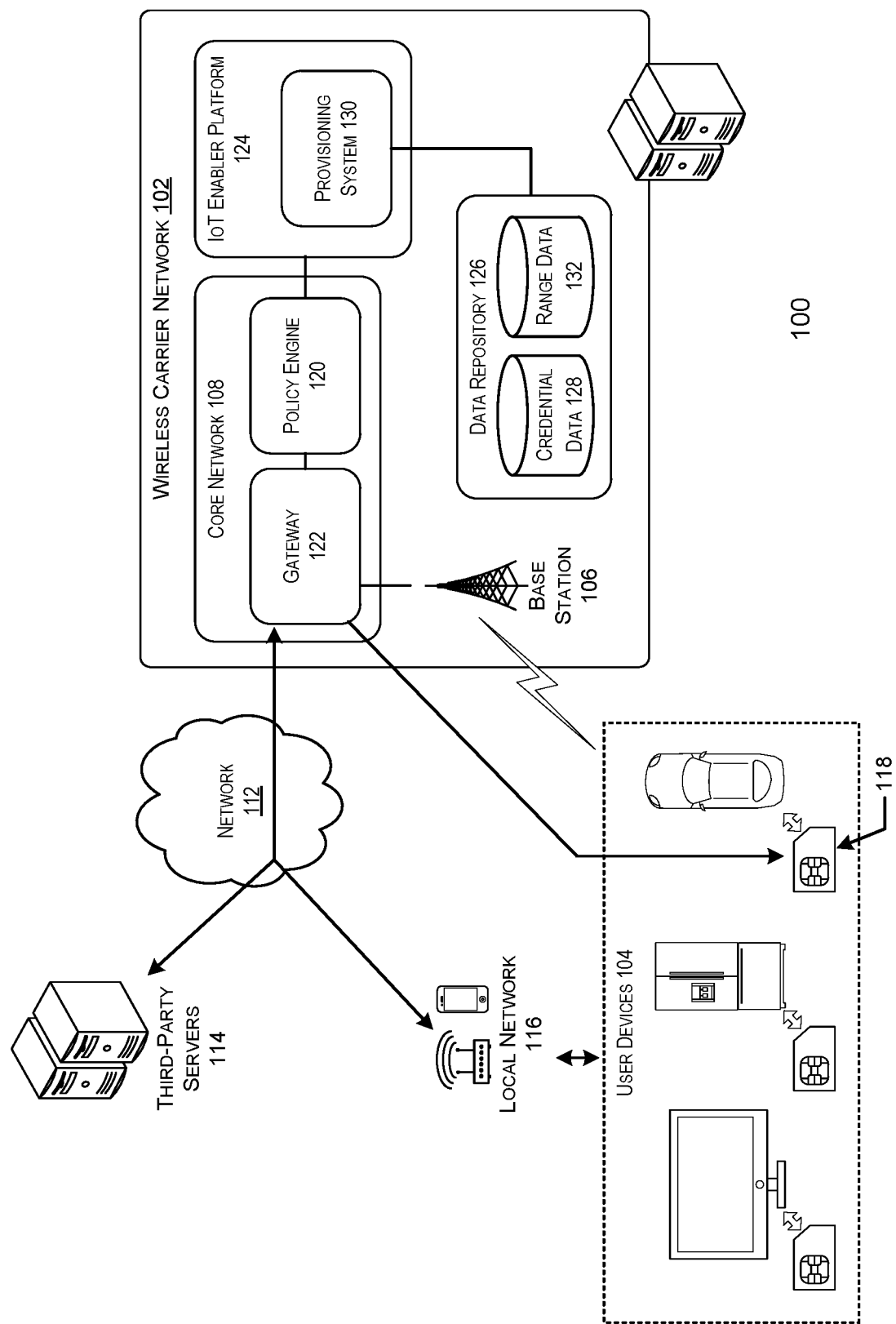
FIG. 1 illustrates an example architecture of a wireless carrier network for implementing techniques for performing a secure bootstrapping and provisioning operation for an electronic device in accordance with embodiments of the disclosure.

FIG. 1 illustrates an example architecture of a wireless carrier network for implementing techniques for performing a secure bootstrapping and provisioning operation for an electronic device in accordance with embodiments of the disclosure. The architecture 100 may include a wireless carrier network 102 that serves multiple user devices, such as user devices 104. The user devices 104 may include any of a feature phone, a smartphone, a tablet computer, a phablet, an embedded computer system, an Internet of Things (IoT) device, or any other device that is capable of using the wireless communication services that are provided by the wireless carrier network 102 to communicate with other electronic devices.

The wireless carrier network 102 may include multiple base stations, such as the base station 106, as well as a core network 108. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long-term Evolution (LTE), CDMA-2000 (Code Division Multiple Access 2000), $4^{th}$ Generation (4G), $5^{th}$ Generation (5G), and/or so forth. The base stations are responsible for handling data traffic between user devices and the core network 108. In some embodiments, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices.

The core network 108 may provide telecommunication and data communication services to multiple user devices 104. For example, the core network 108 may connect the user devices 104 to other telecommunication and data communication networks, such as a network 112 (e.g., the Internet) and a public switched telephone network (PSTN). Accordingly, data packet communications via the core network 108 and the Internet may support a variety of services provided by third-party provider servers 114. Additionally, each of the multiple user devices 104 may be further configured to interact with a network 112 via an alternative communication channel. For example, one or more of the user devices 104 may establish communication with the network 112 via short-range wireless communication with a local network 116, such as a local wireless access network (WLAN) maintained by a router or a mobile phone in communication with the device (e.g., via Bluetooth®, WiFi, or other suitable short-range wireless means).

Each of the user devices 104 may be network-enabled devices, in that they are capable of interaction with other electronic devices to perform at least a portion of their functions. Such devices may typically be referred to as Internet of Things (IoT) devices. The device may be configured to perform a primary function that is unrelated to communication with other electronic devices. Some non-limiting examples of an IoT device might include a smart television, a smart refrigerator, a vehicle, or any household appliance that is configured to interact with a network 112. IoT devices that are configured for long-range communication (e.g., communication enabled via the wireless carrier network 102) may be associated with one or more identifiers. For example, each device may include an International Mobile Equipment Identity (IMEI) number that is unique to that device. Additionally, in some embodiments, the user device 104 may be configured to receive a Subscriber Identity Module (SIM) card 118 that can be inserted into the device. Such a SIM card may be associated with an International Mobile Subscriber Identity (IMSI) that is unique to that SIM card. It should be noted that while the SIM card 118 is depicted as a physical card, a SIM may be virtual instead. A virtual SIM (or eSIM) is a remotely stored (e.g., cloud-based) mapping between a device and an IMSI that can be used by a device via a locally executed software application.

In embodiments, each user device 104 may be pre-loaded with a cryptographic key unique to that device. This cryptographic key (and/or its counterpart) may be written to the user device 104 during its manufacture (e.g., hardcoded) and may be provided to a wireless carrier network on which the device is intended to operate. It should be noted that if the device is then re-configured to work on a different wireless carrier network, that wireless carrier network may not have access to the cryptographic key, potentially preventing the use of the user device 104 on that wireless network. Accordingly, in some embodiments, the user device 104 may be configured to store a second cryptographic key (e.g., a limited use credential and/or a long-term credential) for use in securing communications that is different from the hard-coded cryptographic key.

The core network 108 may include at least a policy engine 120 and a gateway 122. The policy engine 120 may be a software component that determines policy and enforces policy rules and serves to establish communication sessions and allocate bandwidth to devices associated with those communication sessions. In various embodiments, the policy engine 120 may include a Policy and Charging Rules Function (PCRF) or another equivalent core network component of the wireless carrier network 102. Accordingly, the policy engine 120 may interface with the gateway 122 to allocate network resources for handling incoming and outgoing communications.

The gateway 122 may include one or more servers and related components that are tasked with providing connectivity between the core network 108, various user devices (e.g., the user devices 104), and one or more third-party servers 114 by acting as a point of entry and exit for data traffic. In turn, the core network 108 may provide the user devices with data access to external packet data networks 112, such as the networks of other wireless carrier networks or the Internet. Accordingly, the gateway 122 may perform functions such as policy enforcement, packet filtering, packet screening, and/or charging support. In various embodiments, the gateway 122 may be a Packet Data Network Gateway (PGW) or another equivalent core network component of the wireless carrier network 102.

In some embodiments, the wireless carrier network 102 may include an IoT enabler platform 124 for enabling interactions between IoT devices (e.g., user devices 104) and third-party servers 114. Additionally, the wireless carrier network 102 may maintain a data repository 126 that includes a number of data stores related to management of IoT devices. Particularly, the data repository may contain a data store of mappings between each user device 104 and a cryptographic key that corresponds to the user device 104 (e.g., credential data 128).

An IoT enabler platform 124 facilitates interactions between user devices 104 and various other devices, such as the third-party servers 114. In some embodiments, this involves managing encryption and decryption of communications transmitted between the devices. For example, messages routed to the wireless carrier network 102 from a user device 104 may be cryptographically secured using a cryptographic key specific to the user device 104. Upon receiving such a communication, the core network 108 may determine that the communication pertains to an IoT device. In accordance with policies implemented by the core network 108, the communication may be routed to the IoT enabler platform 124 by the policy engine 120. Upon receipt of the communication, the IoT enabler platform 124 may perform a lookup operation to retrieve a cryptographic key associated with the IoT device from which the communication originated. The communication may then be decrypted using the retrieved cryptographic key. In some embodiments, either the IoT enabler platform or the core network 108 may re-encrypt the communication before routing it to its intended recipient (e.g., a third-party server 114). In at least some of these embodiments, re-encryption may be performed using a cryptographic key associated with the recipient entity.

The wireless carrier network 102 may further include a provisioning system 130 configured to enable wireless carrier interaction with a user device. In some embodiments, the provisioning system receives an indication (e.g., from a device manufacturer) of a type of user device for which functionality is to be implemented on the wireless carrier network and configures the wireless carrier network to perform that functionality. In some embodiments, this involves allocating a range of IMSI numbers for use by a group of user devices. The provisioning system can then activate a number of SIMs by mapping IMSI numbers associated with those SIMs to MSISDNs.

By way of illustrating various interactions between the components depicted in FIG. 1, consider the following example. In this example, the core network 108 may receive a request from a user device 104 that is not currently associated with the wireless carrier network 102 requesting that the user device be added to the network. In these embodiments, an activation event is routed to the IoT enabler platform 124 to in order to cause the user device to be configured to work with the wireless carrier network. Alternatively, in some embodiments, the IoT enabler platform 124 may attempt to retrieve a cryptographic key associated with a user device 104 and may fail in retrieving the cryptographic key. For example, the IoT enabler platform 124 may discover that it does not have a record of such a cryptographic key either because the manufacturer never provided it to the wireless carrier network (e.g., because the IoT was intended to operate on a different wireless carrier network), or because the record has become corrupted or lost. In these embodiments, the IoT enabler platform may initiate a bootstrapping process to provision the user device 104. In some embodiments, the IoT enabler platform 124 may receive an indication of an identifier to be associated with the IoT device, such as the IMEI for the user device and/or an IMSI associated with a SIM included within the user device 104. The IoT enabler platform 124 may, upon receiving the activation event, identify a Mobile Station International Subscriber Directory Number (MSISDN) assigned to the user device (e.g., by the provisioning system 130). In some embodiments, the IoT enabler platform 124 may verify that the IMSI falls within a range of values authorized to be used with a specified set of IMEIs. To do this, the IoT enabler platform may retrieve IMSI range data 132 stored in relation to a manufacturer of the user device 104 and compare the received IMSI with that IMSI range data.

The IoT enabler platform 124, upon receiving instructions to bootstrap a device, may generate a cryptographic key to be provisioned onto the user device 104. In some embodiments, the IoT enabler platform 124 may generate both a temporary (e.g., limited use or one-time use) cryptographic key as well as a long-term (e.g., permanent) cryptographic key to be used in future communications. In some embodiments, the temporary cryptographic key may first be provided to the user device 104 via a first communication channel. For example, the temporary cryptographic key may be provided to the user device 104 via an Over the Air (OTA) transmission (e.g., via a short messaging service (SMS) push message) by way of the MSISDN assigned to the user device 104. In some embodiments, the temporary cryptographic key is written to a memory of the user device 104. In some embodiments, the temporary cryptographic key is written directly to the SIM card 118 rather than to a memory of the user device 104.

Once the temporary cryptographic key has been received by the user device via the first channel, the user device then automatically (e.g., without user interaction) initiates a client-side bootstrapping process to replace the temporary cryptographic key with the long-term cryptographic key. To do this, the user device transmits a request to the IoT enabler platform 124 using a second channel. In some cases, the second channel is a mobile data channel, such as Long-Term Evolution (LTE) data via Enhanced Packet Core (EPC). In some embodiments, the request is encrypted using the temporary cryptographic key.

Once the request is received from the user device 104 at the IoT enabler platform 124, the IoT enabler platform establishes a communication session via a second channel. The IoT enabler platform 124 provides the long-term cryptographic key to the user device via the second channel. In some embodiments, the long-term cryptographic key is encrypted using the temporary cryptographic key, or such that it may be decrypted using the temporary cryptographic key. The temporary key on the user device 104 is then overwritten with the long-term cryptographic key. Additionally, the IoT enabler platform 124 may deactivate the temporary cryptographic key.

Figure 2:
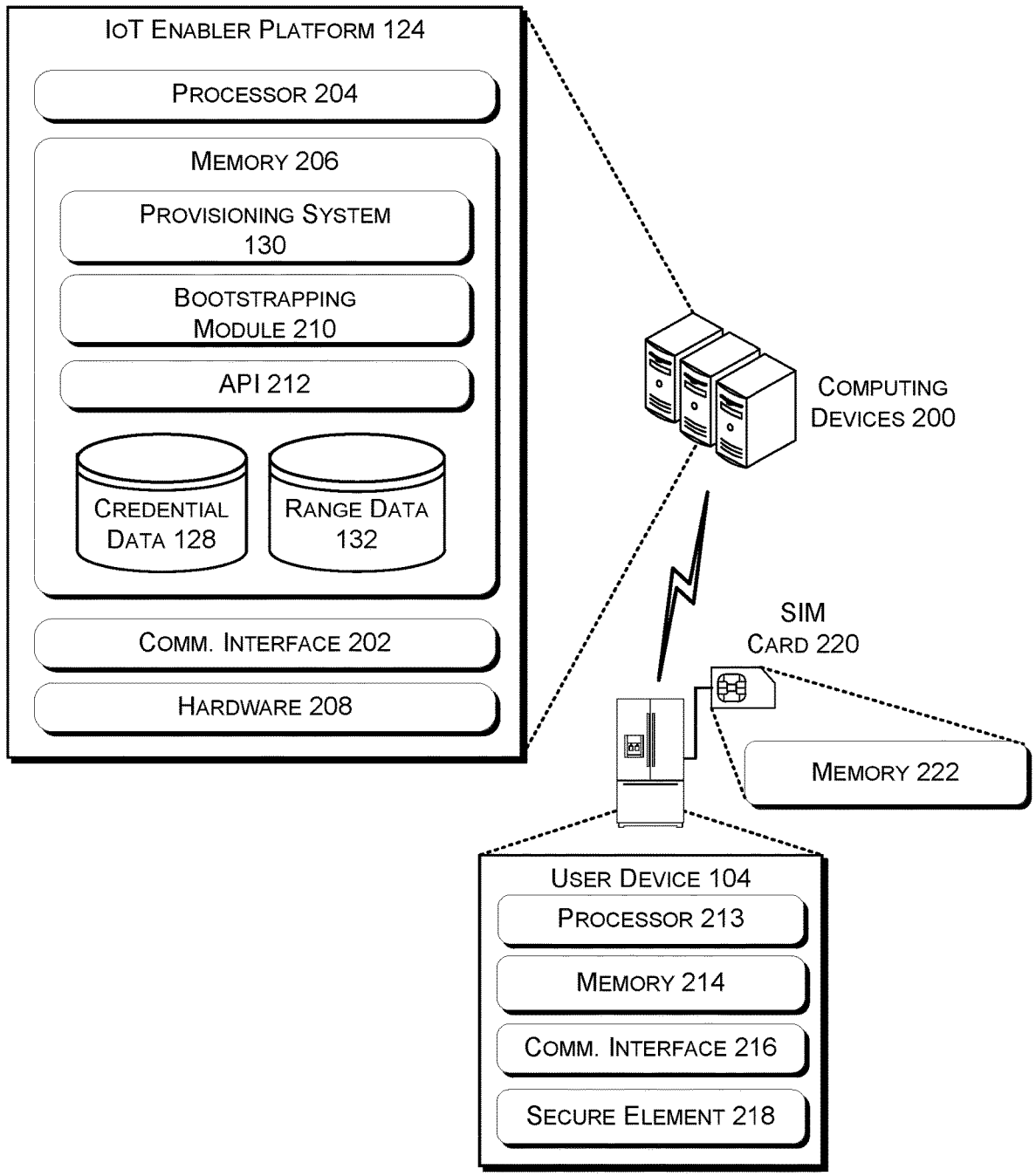
FIG. 2 is a block diagram showing various components of a system architecture that supports automatic provisioning and bootstrapping of a user device in accordance with embodiments.

FIG. 2 is a block diagram showing various components of a system architecture that supports automatic provisioning and bootstrapping of a user device in accordance with embodiments. The system architecture may include one or more computing devices 200 on which an IoT enabler platform 124 is implemented. In some embodiments, the one or more computing devices 200 may include a number of geographically diverse "bootstrapping" servers on which at least a portion of the functionality attributed to the IoT enabler platform 124 herein is implemented. In at least some of these embodiments, a bootstrapping process performed with respect to a particular user device may be performed on a bootstrapping server most appropriate to service that user device (e.g., a geographically proximate bootstrapping server).

The computing devices 200 may include a communication interface 202, one or more processors 204, memory 206, and hardware 208. The communication interface 202 may include wireless and/or wired communication components that enable the computing devices 200 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer storage media does not include communication media The one or more processors 204 and the memory 206 of the computing devices 200 may implement functionality from or one or more software modules and data stores. Such software modules may include routines, program instructions, objects, and/or data structures that are executed by the processors 204 to perform particular tasks or implement particular data types. The one or more software modules may include a provisioning system 130 that allocates ranges of IMSIs for use with particular types of user device, as well as a bootstrapping module 210 that configures a user device for operation with a wireless carrier network. The data stores may include a database of cryptographic key mapping data (credential data 128) as well as a mapping of ranges of IMSI numbers to user devices (e.g., range data 132). In some embodiments, the memory 206 may include an application programming interface (API) 212 that may be used by a user device 104 to interact with the IoT enabler platform 124. For example, the API 212 may receive a bootstrapping request that is initiated by the user device 104 and send the request to the bootstrapping module 210.

The provisioning system 130 may be configured to allocate a range of IMSI numbers for use by a type of user device. For example, upon receiving request (e.g., from a manufacturer) to operate a number of user devices on a wireless carrier network, the provisioning system may identify a range of IMSI numbers that are currently unassigned to be allocated for use by the user devices. In some embodiments, the provisioning system 130 may also receive a list of IMEIs for the user devices to be operated on the wireless carrier. The provisioning system may also assign MSISDNs to each of the IMSIs in the range of IMSI numbers.

The bootstrapping module 210 may be configured to, upon receiving a bootstrapping request from the user device 104, configure that user device to operate on the wireless carrier network associated with the IoT enabler platform 124. Particularly, the bootstrapping module 210 may be configured to write data related to an account associated with the user device to a memory of that user device in order to configure it to operate on the wireless carrier network. In some embodiments, the bootstrapping request may be cryptographically secured using a limited use credential associated with the user device. In some embodiments, the bootstrapping module 210 may be configured to write at least a portion of the data to a SIM card inserted into the user device 104. For example, the bootstrapping module 210 may retrieve a long-term credential assigned to the user device and write that long-term credential to the SIM card.

The user device 104 may be any electronic device capable of interacting with the computing devices 200 as described herein. The user device 104 may include a processor 213 and a computer readable memory 214 as well as a communication interface 216. In some embodiments, the user device 104 may include a secure element 218 comprised of software and tamper resistant hardware that allow high levels of security by enabling implementation of a trusted execution environment.

The user device 104 may be configured to accept a SIM card 220 that can be inserted into the user device 104. The SIM card may be a universal integrated circuit card (UICC) that includes a memory 222 and processor that can be powered by the user device.

Figure 3:
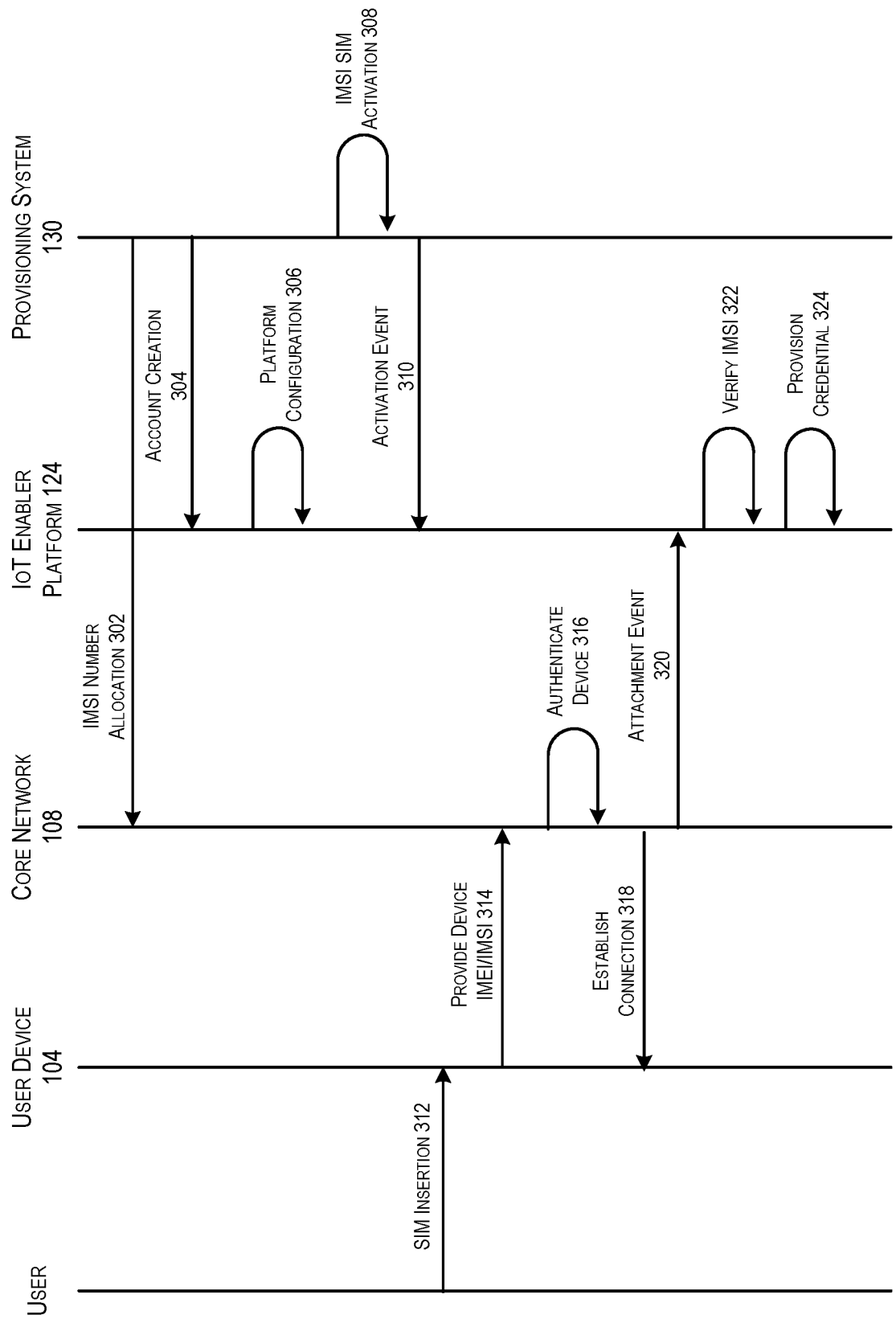
FIG. 3 depicts a block diagram showing an example process flow for securely providing credentials to a user device in accordance with embodiments.

FIG. 3 depicts a block diagram showing an example process flow for securely providing credentials to a user device in accordance with embodiments. The process 300 involves interactions between various components of the architecture 100 described with respect to FIG. 1. More particularly, the process 300 involves interactions between a user device 104, a core network 108 of a wireless carrier network, an IoT enabler platform 124 of the wireless carrier network, and a provisioning system 130. Additionally, at least a portion of the process 300 may involve one or more interactions between a user and the user device 104.

At 302, the process comprises performing a subscriber provisioning process between the provisioning system and the network core. In this process, IMSI numbers are allocated and configured for use within a mobile network. In this process, a range of IMSI numbers may be assigned to a particular device manufacturer and/or type of device. For example, upon receiving a request to configure an IoT device for use with the wireless carrier network (e.g., from a manufacturer of the IoT device), a range of currently unassigned IMSI numbers may be identified to be associated with that IoT device. Each range of selected IMSI numbers may include any number of IMSI numbers. In some embodiments, the numbers included in the selected range may not be sequential. For example, a range may be selected that consists of a first and second sequence of numbers where each of the sequences are separated by a third sequence of numbers.

At 304, the process comprises creating an account to be associated with the allocated IMSI numbers and the subscriber (e.g., the IoT device/device manufacturer). In some embodiments, the account is created by an administrator associated with the wireless carrier network. In some embodiments, the account is created automatically by the provisioning system. Upon creation of the account, the allocated range of IMSI numbers are reserved for use by that account. A set of access permissions is then determined for the account based on requirements associated with the IoT device, and that set of permissions is then associated with the allocated range of IMSI numbers. In some embodiments, the provisioning system 130 is a module within the IoT enabler platform 124 whose functionality may be called via one or more method calls. While the provisioning system 130 is depicted as being included within the IoT enabler platform 124 in FIG. 2, it should be noted that the provisioning system 130 may be separate from the IoT enabler platform. In embodiments, in which the provisioning system 130 is separate from the IoT enabler platform 124, the provisioning system may be in communication with the IoT enabler platform 124. In some embodiments, the two components may communicate using respective APIs.

At 306, the process 300 comprises configuring the IoT enabler platform to provide support for the account based on the determined set of permissions. For example, one or more policies are generated by the IoT enabler platform that cause incoming communications received in connection with the IMSI range to be routed in a manner consistent with the set of permissions. In some embodiments, this involves configuring the IoT enabler platform to route activation requests received in relation to the allocated range of IMSI numbers to the provisioning system.

At 308, the process 300 comprises activating a SIM for each of the IMSIs in the range of IMSIs. This may involve mapping SIMs to each of the IMSIs in the range of IMSIs and storing an indication of that mapping. The SIMs can then be distributed. In some cases, this may involve the production and generation of physical SIM cards. In some embodiments, this may involve making the SIM available via a virtual SIM assignment application. The provisioning system generates an activation event associated with each IMSI number that is then sent to the IoT enabler platform at 310. The IoT enabler platform then assigns a MSISDN to the IMSI.

At 312, the process 300 comprises activating a SIM for a particular user device. In some cases, this may first involve a user inserting a SIM card into the user device and turning the user device on. In other cases, a virtual SIM may be provisioned onto the user device upon execution of a mobile application installed on that user device.

At 314, the user device submits a request to establish a connection with the core network and provides one or more identifiers (e.g., an IMEI of the user device and/or an IMSI) to the core network. The user device may connect to the core network using any suitable communication channel. For example, the user device may connect to a local network (e.g., a WLAN) and, through that, access the core network via an Internet connection. In another example, the user device may connect to the core network via a mobile communication service, such as a 4G mobile communication channel that uses a long-term evolution (LTE) standard.

Upon receiving a request to establish a connection with the user device, the core network performs mobile security procedures at 316 in which it authenticates the user device based on the provided IMSI. Particularly, the core network may confirm that the user device is not banned or on a blacklist. In some cases, this may be done by comparing the received IMEI with IMEIs on a list of blacklisted user devices. Once the user device has been authenticated, the connection is established between the core network and the user device at 318.

At 320, the process 300 comprises generating an attachment event for the user device that includes the IMEI and IMSI of the user device. The attachment event is routed to the IoT enabler platform. The IoT enabler platform then maps the received IMEI for the user device to the IMSI based on the received attachment event, which also associates the MSISDN associated with the IMSI to the IMEI. This allows the user device to receive communications directed to the MSISDN.

At 322, a verification is performed to ensure that the attached IMSI is in the allowed IMSI range and subject to the set of permissions previously generated. Particularly, an allocated range of IMSI numbers for the user device is retrieved based on a type (e.g., model, brand, etc.) of the user device and the core network then checks to see that the received IMSI falls within the allocated range. In some cases, a list of IMEIs may be provided to the IoT enabler platform in advance as being associated with a particular range of allocated IMSI numbers. For example, a manufacturer of a user device may provide a list of IMEIs for the user devices that were manufactured for use with the wireless carrier network.

At 324, the process comprises automatically provisioning one or more credentials (e.g., cryptographic keys) onto the user device or onto a SIM card installed in the user device. In some embodiments, this comprises a generation of a limited use (e.g., one-time use) credential that is matched with an address of a bootstrapping server. A bootstrapping server may be a server that is configured to perform at least a portion of the process described herein that may be selected based on factors associated with the user device (e.g., proximity). The limited use credential is packed into a security object. Additionally, a long-term credential is also generated and associated with the user device. In some embodiments, the long-term credential may be encrypted or otherwise secured such that it may be accessed using the limited use credential. These credentials are then written to the user device or SIM card using the process for providing automated bootstrapping described below.

Figure 4:
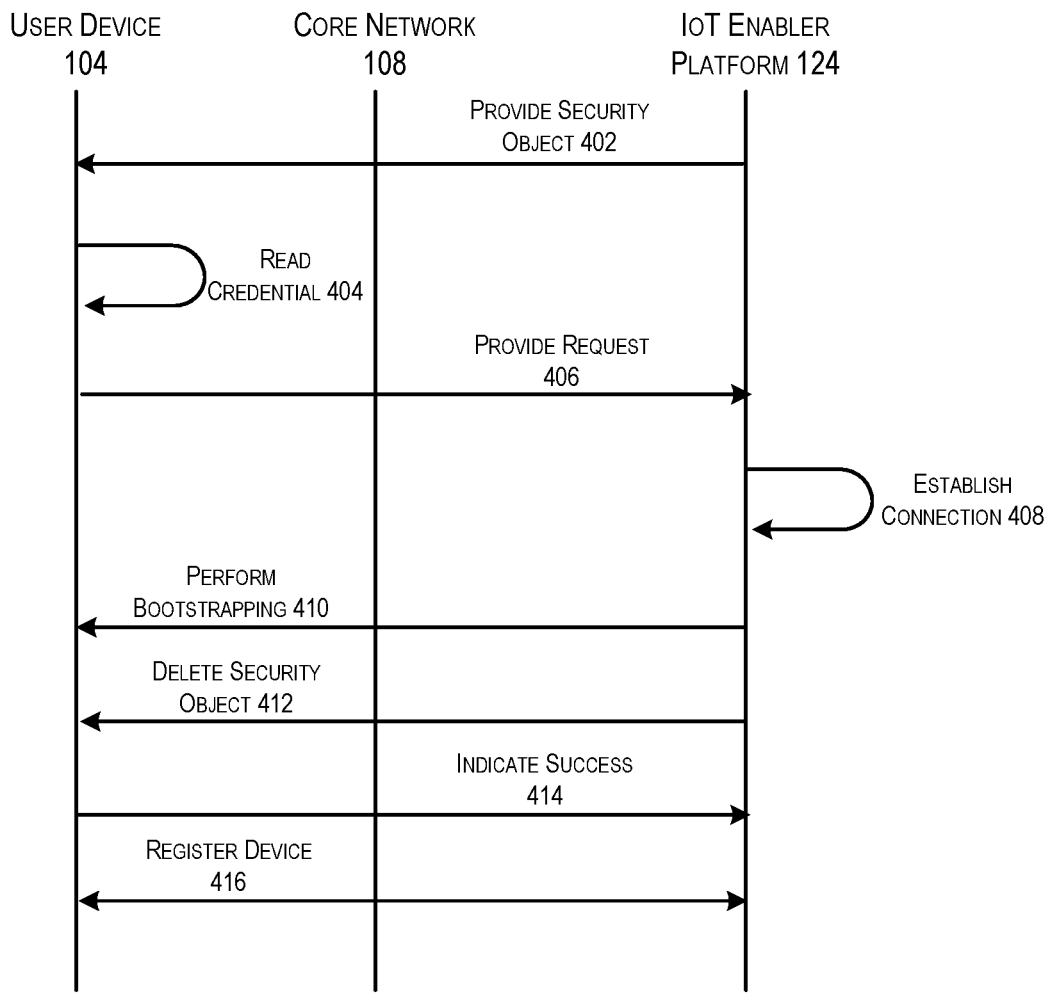
FIG. 4 depicts a block diagram showing an example process flow for providing automated bootstrapping in accordance with embodiments.

FIG. 4 depicts a block diagram showing an example process flow for providing automated bootstrapping in accordance with embodiments. The process 400 involves interactions between various components of the architecture 100 described with respect to FIG. 1. More particularly, the process 400 involves interactions between a user device 104, a core network 108 of a wireless carrier network, and an IoT enabler platform 124 of the wireless carrier network. It should be noted that the process 400 may be performed automatically (e.g., independent of any user interaction).

At 402, the process 400 comprises providing, by the IoT enabler to the user device, a security object that includes a limited-use credential. The security object, which is the security object generated at 324 of the process 300, is provided to the user device via a first communication channel A first communication channel may be any suitable communication channel that is available to the IoT device that differs from a mobile data channel (i.e., the first communication channel is "out of band" with respect to the mobile data channel). For example, the first communication channel may be an OTA channel through which an SMS message that includes the security object is pushed to the user device. In this example, the OTA channel is established via the MSISDN that was assigned to the IMSI. In another example, the security object may be pushed to the user device through a local network connection. For example, the security object may be pushed through the Internet to a router device that maintains a local network and from there pushed to the user device (e.g., via a Wi-Fi connection). As noted above, the security object may also include an address of a bootstrapping server.

At 404, the user device reads the limited-use credential from the security object and writes the limited-use credential to a memory. In some embodiments, the limited-use credential is written to a computer readable memory of the user device itself. In at least some of these embodiments, the limited-use credential may be written to a secure element within the user device that is reserved for an eSIM. In some embodiments, the limited-use credential is written to a memory on a SIM card inserted into the user device.

At 406, the user device generates and provides, independent of any user interaction, a communication to a bootstrapping server at the address included in the security object. The communication may comprise a bootstrapping request and may include identifying information for the user device such as an IMEI, IMSI, or any other suitable identifier. In some embodiments, information included within the bootstrapping request is cryptographically secured using the limited use credential. For example, the information may be encrypted using the limited use credential as a cryptographic key. The bootstrapping request is transmitted to the network core and relayed to the IoT enabler platform via a second communication channel. The second communication channel may include a mobile data channel, such as a 4G mobile communication channel that uses a long-term evolution (LTE) standard.

At 408, the IoT enabler platform, upon receiving the bootstrapping request from the user device, establishes a connection between the IoT enabler platform and the user device that is secured using the limited use credential. In some embodiments, the IoT enabler platform deactivates the limited use credential so that it can no longer be used in future communications.

At 410, the IoT enabler platform then initiates one or more bootstrapping processes. In some embodiments, the one or more bootstrapping processes comprise writing various data to a memory of the user device (or SIM). Such various data may include account data and/or credentials related to an account associated with the user device. Additionally, the IoT enabler platform writes the long-term credential to the memory of the user device (or SIM). Particularly, the limited use credential in memory is overwritten with the long-term credential. In some embodiments, additional actions may be taken at this time by the IoT enabler platform based on a standard and/or operating requirements associated with the user device. At 412, the IoT enabler platform optionally deletes the security object from the memory of the user device.

At 414, the user device detects any error conditions and, provided that no error conditions are detected, indicates to the IoT enabler platform that the bootstrapping process was successful.

At 416, the user device, using the data written to its memory during the bootstrapping process, registers with the wireless carrier network for device management. Upon being registered, the user device is able to securely convey communications to other electronic devices (e.g., a third-party server) using the wireless carrier network, in that those communications are secured using the long-term credential.

Figure 5:
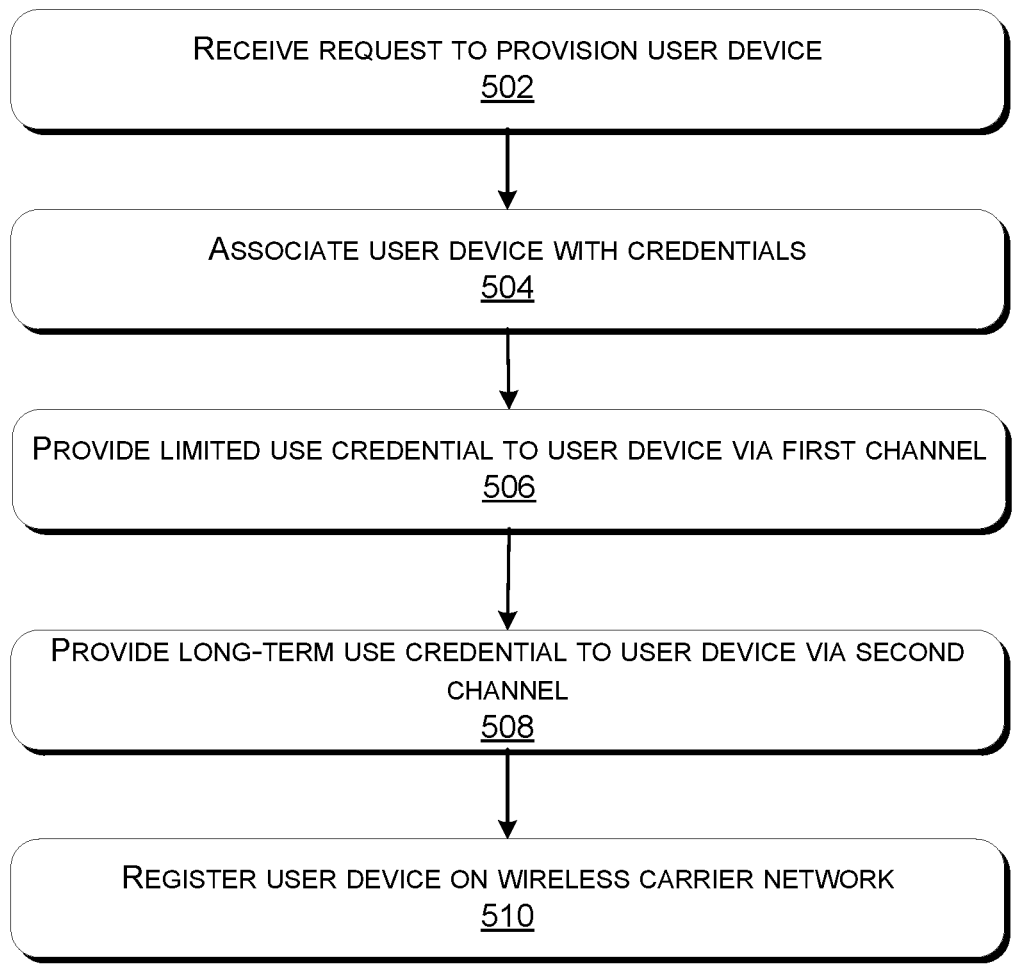
FIG. 5 depicts a flow diagram showing an example process flow for provisioning a long-term use credential onto a user device for use with a wireless carrier network in accordance with embodiments.

FIG. 5 depicts a flow diagram showing an example process flow for provisioning a long-term use credential onto a user device for use with a wireless carrier network in accordance with embodiments. The process 500 may be performed by a computing device within a wireless carrier network. For example, the process 500 may be performed by a server that performs the functionality attributed to the IoT enabler platform 124 as described herein.

At 502, the process 500 comprises receiving a request to provision a user device, the request comprising at least an identifier for the user device. In some embodiments, the user device is an Internet of Things (IoT) device that is configured to perform a primary function unrelated to communication. For example, the user device may be a smart television, a smart refrigerator, an audio assistant, a vehicle with wireless capabilities, or any other suitable electronic device.

At 504, the process 500 comprises associating a limited use credential, a long-term use credential, and a communication identifier with the identifier for the user device. In some embodiments, the communication identifier is associated with a subscriber identification module (SIM). In at least some of these embodiments, a SIM may comprise physical UICC inserted into the user device. In some of these embodiments, a SIM may comprise a virtual SIM (e.g., an eSIM) stored on a remote computing device.

At 506, the process 500 comprises providing, via a first communication channel related to the communication identifier, the limited use credential to the user device. In some embodiments, the first communication channel comprises a short messaging service (SMS) push message generated for a Mobile Station International Subscriber Directory Number (MSISDN) assigned to the user device.

In some embodiments, the method further comprises, prior to providing the limited use credential to the user device, authenticating that the communication identifier is authorized for use with the user device. This may involve checking to ensure that the communication identifier is within a range of communication identifiers authorized for use with the user device. For example, the method may comprise checking to ensure that an IMSI associated with the user device is within a range of IMSI numbers allocated to the user device.

At 508, the process 500 comprises providing, via a second communication channel different from the first communication channel, the long-term use credential to the user device. In some embodiments, the second communication channel comprises a mobile data channel. For example, the mobile data channel may comprise a 4G mobile communication channel that uses a long-term evolution (LTE) standard.

In some embodiments, the long-term use credential is cryptographically secured using the limited use credential. For example, the limited use credential may be a cryptographic key, and the long-term use credential may have been encrypted using the limited use credential via an encryption algorithm.

In some embodiments, the limited use credential is overwritten with a decrypted version of the long-term use credential. In embodiments in which the SIM is a UICC inserted into the user device, each of the limited use credential and the long-term use credential may be written to the SIM. In some embodiments, the user device may include a secure element that provides for implementation of a trusted execution environment on the user device. In at least some of these embodiments, the limited use credential and the long-term use credential may be written to that secure element.

In some embodiments, the long-term use credential is provided to the user device upon receiving a communication from the user device indicating receipt of the limited use credential. For example, the communication may comprise a bootstrapping request that is secured (e.g., encrypted) using the limited use credential.

At 510, the process 500 may further comprise registering the user device for operation on the wireless carrier network. Subsequent to registering the user device, the user device is authorized to communicate with one or more third-party electronic device over the wireless carrier network. For example, the user device may communicate with a remote server that provides backend support for the user device and/or at least one software application installed upon the user device. In such embodiments, future communications between the computing device and the user device are cryptographically secured using the long-term credential.

What is claimed is:

1. A method comprising:
receiving, at a wireless carrier network, a request to provision a user device, the request comprising at least an identifier for the user device;
associating, by the wireless carrier network, a limited use cryptographic key, a long-term use cryptographic key, and a communication identifier with the identifier for the user device;
upon detecting activation of the identifier for the user device, providing, by the wireless carrier network via a first communication channel related to the communication identifier, the limited use cryptographic key to the user device for storage at the user device;
providing, by the wireless carrier network via a second communication channel different from the first communication channel, the long-term use cryptographic key to the user device, the long-term use cryptographic key being cryptographically encrypted using the limited use cryptographic key for transmission to the user device via the second communication channel, wherein the limited use cryptographic key as stored at the user device is overwritten with a decrypted version of the long-term use cryptographic key; and
registering the user device on the wireless carrier network such that the user device is authorized to communicate with one or more third-party electronic devices over the wireless carrier network.

2. The method of claim 1, wherein the communication identifier is associated with a subscriber identification module (SIM), and the limited use cryptographic key and the long-term use cryptographic key are written to the SIM.

3. The method of claim 2, wherein the SIM comprises a universal integrated circuit card that is inserted into the user device.

4. The method of claim 1, wherein the second communication channel comprises a mobile data channel.

5. The method of claim 4, wherein the mobile data channel comprises a 4G mobile communication channel that uses a long-term evolution (LTE) standard.

6. The method of claim 1, wherein the method further comprises, prior to providing the limited use cryptographic key to the user device, authenticating that the communication identifier is authorized for use with the user device.

7. A computing device comprising:
a processor; and
a memory including instructions that, when executed with the processor, cause the computing device to, at least:
receive a request to provision a user device, the request comprising at least an identifier for the user device;
associate a limited use cryptographic key, a long-term use cryptographic key, and a communication identifier with the identifier for the user device;
upon detecting activation of the identifier for the user device, provide, via a first communication channel related to the communication identifier, the limited use cryptographic key to the user device for storage at the user device; and
upon receiving a communication from the user device indicating receipt of the limited use cryptographic key, provide, via a second communication channel different from the first communication channel, the long-term use cryptographic key to the user device, the long-term use cryptographic key being cryptographically encrypted using the limited use cryptographic key for transmission to the user device via the second communication channel, wherein the limited use cryptographic key is overwritten with a decrypted version of the long-term use cryptographic key,
wherein the communication comprises a bootstrapping request that is secured using the limited use cryptographic key.

8. The computing device of claim 7, wherein the first communication channel comprises a short messaging service (SMS) push message generated for a Mobile Station International Subscriber Directory Number (MSISDN) assigned to the user device.

9. The computing device of claim 7, wherein future communications between the computing device and the user device are cryptographically secured using the long-term use cryptographic key.

10. The computing device of claim 7, further comprising a secure element, wherein at least one of the limited use cryptographic key or the long-term use cryptographic key are written to the secure element.

11. The computing device of claim 10, wherein the secure element includes a trusted execution environment.

12. The computing device of claim 11, wherein the second communication channel comprises a mobile data channel.

13. The computing device of claim 7, wherein the user device is an Internet of Things (IoT) device that is configured to perform a primary function unrelated to communication.

14. A non-transitory computer-readable media collectively storing computer-executable instructions that upon execution cause one or more computing nodes to collectively perform acts comprising:
- receiving a bootstrapping request associated with a user device, the bootstrapping request comprising at least an identifier for the user device;
- associating a limited use cryptographic key, a long-term use cryptographic key, and a communication identifier with the identifier for the user device;
- upon detecting activation of the identifier for the user device, providing, via a first communication channel related to the communication identifier, the limited use cryptographic key to the user device for storage at the user device;
- providing, via a second communication channel different from the first communication channel, the long-term use cryptographic key to the user device, the long-term use cryptographic key being cryptographically encrypted secured using the limited use cryptographic key for transmission to the user device via the second communication channel, wherein the limited use cryptographic key as stored at the user device is overwritten with a decrypted version of the long-term use cryptographic key; and
- registering the user device with a wireless carrier network subsequent to providing the long-term use cryptographic key.

15. The non-transitory computer-readable media of claim 14, wherein the computer-executable instructions further cause the one or more computing nodes to write account data associated with the user device to a memory of the user device.

* * * * *